United States Patent
Zou et al.

(10) Patent No.: US 8,206,830 B2
(45) Date of Patent: Jun. 26, 2012

(54) GLASS MATERIAL FOR MOLD PRESSING AND METHOD FOR MANUFACTURING OPTICAL GLASS ELEMENT

(75) Inventors: Xuelu Zou, Shinjuku-ku (JP); Yasuhiro Fujiwara, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 569 days.

(21) Appl. No.: 12/295,620

(22) PCT Filed: Mar. 28, 2007

(86) PCT No.: PCT/JP2007/056675
§ 371 (c)(1),
(2), (4) Date: May 18, 2009

(87) PCT Pub. No.: WO2007/114172
PCT Pub. Date: Oct. 11, 2007

(65) Prior Publication Data
US 2009/0314033 A1    Dec. 24, 2009

(30) Foreign Application Priority Data

Mar. 31, 2006   (JP) ................................ 2006-100833

(51) Int. Cl.
*B32B 17/06*    (2006.01)
*C03B 23/02*    (2006.01)
(52) U.S. Cl. ............... 428/426; 428/428; 65/31; 65/102
(58) Field of Classification Search .................. 428/426, 428/428; 65/31, 117, 102
See application file for complete search history.

(56) References Cited

U.S. PATENT DOCUMENTS

| | | | | |
|---|---|---|---|---|
| 3,899,314 | A * | 8/1975 | Siegmund | 65/23 |
| 5,192,352 | A * | 3/1993 | Kuwabara et al. | 65/60.53 |
| 2004/0082460 | A1 * | 4/2004 | Yamane et al. | 501/48 |
| 2004/0259714 | A1 * | 12/2004 | Fujiwara et al. | 501/45 |
| 2004/0261455 | A1 * | 12/2004 | Igari et al. | 65/24 |
| 2005/0049135 | A1 * | 3/2005 | Hayashi | 501/78 |
| 2005/0054511 | A1 * | 3/2005 | Fujiwara et al. | 501/45 |
| 2005/0143250 | A1 * | 6/2005 | Fujiwara et al. | 501/48 |
| 2005/0188724 | A1 * | 9/2005 | Ikenishi et al. | 65/31 |
| 2007/0060464 | A1 * | 3/2007 | Ikenishi et al. | 501/48 |

FOREIGN PATENT DOCUMENTS

| | | |
|---|---|---|
| CN | 1552649 A | 12/2004 |
| JP | 57-004735 A | 1/1982 |
| JP | 60-033221 A | 2/1985 |
| JP | 04-083724 A | 3/1992 |
| JP | 2005-247658 A | 9/2005 |
| JP | 2005-247659 A | 9/2005 |
| JP | 2005-272253 A | 10/2005 |

OTHER PUBLICATIONS

Kaketa JP 60-033221 (Patent Abstracts of Japan) Feb. 20, 1985.*
Chinese Office Action corresponding to Chinese Patent Application No. 200780016443.8, dated Oct. 21, 2010.
Chinese Office Action corresponding to Chinese Patent Application No. 200780016443.8, dated Jun. 28, 2011.
Japanese Office Action corresponding to Japanese Patent Application No. 2006-100833, dated May 15, 2012.

* cited by examiner

*Primary Examiner* — Jennifer McNeil
*Assistant Examiner* — Lauren Robinson
(74) *Attorney, Agent, or Firm* — Sughrue Mion, PLLC

(57) ABSTRACT

A glass material for mold pressing, comprising a core portion comprised of an optical glass with a degree of abrasion FA of 200 or higher and a covering portion comprised of a second glass covering at least a portion of the surface of said core portion. A method for manufacturing an optical glass element, wherein a glass material that has been preformed to a prescribed shape is heat softened and press molded with a pressing mold and the outer perimeter portion of the molded product obtained is removed by mechanical processing. The above-mentioned glass material for mold pressing is used as the glass material. To provide a means whereby an optical element does not bear scratches on optically functional surfaces through contact during handling after the press molding of press molded glass products despite being comprised of a glass material with a high degree of abrasion, and a means whereby even when scratched, the function of the optical element finally obtained is unaffected.

11 Claims, No Drawings

GLASS MATERIAL FOR MOLD PRESSING AND METHOD FOR MANUFACTURING OPTICAL GLASS ELEMENT

CROSS-REFERENCE TO RELATED PATENT APPLICATIONS

The present application claims priority under Japanese Patent Application 2006-100833, filed on Mar. 31, 2006, the entire contents of which are hereby incorporated herein by reference.

TECHNICAL FIELD

The present invention relates to a glass material employed to obtain an optical element by precision mold pressing, and to a method for manufacturing optical elements employing this glass material. More particularly, the present invention relates to a glass material for mold pressing permitting the stable production of optical elements comprised of easily scratched glass having a high degree of abrasion without impeding optical performance, and to a method for manufacturing optical elements employing this glass material.

BACKGROUND ART

The obtaining of optical elements such as glass lenses by precision mold pressing is known. The optically functional surfaces that are formed by press molding afford desired optical performance without requiring mechanical processing such as polishing.

In optical glass elements such as lenses obtained by precision mold pressing, the optically functional surfaces (which are often aspherical) obtained by press molding are employed without further mechanical processing. However, the outer perimeter portion of the molded product is often removed to adapt it to the optical apparatus on which it is being mounted. For example, polishing the outer peripheral surface to define the outer perimeter and aligning the center of the outer perimeter with the optical axis are common practices. Further, as needed, the vicinity of the outer rim of the first and/or second surface of a molded product is often polished to form a flat surface perpendicular to the optical axis. So doing permits accurate positioning of the lens relative to the optical apparatus in which it is mounted.

Optical glasses of low refraction and low dispersion are extremely useful as the materials of lenses constituting optical systems such as image pickup apparatuses. In particular, optical glasses having optical constants such as a refractive index value nd (1) of 1.40 to 1.60 and an Abbé number (v(nu)d) of 67 or higher are useful for eliminating chromatic aberration in zoom lenses and the like. The present inventors developed a glass having such optical constants in the form of a fluorophosphate glass having a new composition. This fluorophosphate glass is a high value-added glass capable of achieving the above-stated optical characteristics. The present inventors also studied the use of this fluorophosphate glass in optical glass elements obtained by precision mold pressing.

Based on investigation conducted by the present inventors, optical glasses having the above-stated optical constants permit optical elements with relatively good mold release properties and high precision in press molding. However, the present inventors determined for the first time that these glasses tended to have high degrees of abrasion, and presented a problem in the form of a tendency to scratch during handling after shaping by mechanical processing such as that set forth above.

Further, optical glasses with high refractive indexes (such as an nd of 1.7 or higher) and high dispersion (such as a v(nu)d of 35 or lower) are highly valued for eliminating chromatic aberration in small image pickup apparatuses and the like, so the need is great. The present inventors developed a phosphate glass with a high refractive index that was capable of responding to these demands. However, this glass also tended to have a high degree of abrasion. As a result, just as with fluorophosphate glass, it was newly revealed that it had a problem in the form of a tendency to scratch during handling after shaping such as mechanical processing.

However, since fluorophosphate glasses and phosphate glasses such as those set forth above are novel, there was no previously known countermeasure to scratching caused by handling after shaping such as mechanical processing of fluorophosphate glasses and phosphate glasses such as those set forth above.

Investigation by the present inventors revealed that those optical glasses having a degree of abrasion of 200 or higher were the ones that tended to scratch during handling after shaping such as mechanical processing. During mechanical processing, particularly during a step known as centering and edging, in which a lens is gripped between opposing bell members and the outer perimeter of the pressed lens is polished with a grindstone, scratches tend to form on the optically functional surfaces of the lens that is being gripped and pressed. These scratches have been found to affect optical performance.

The forming of a coating on the surface of a glass material obtained by press molding is known. For example, Patent Document 1 (Japanese Unexamined Patent Publication (KOKAI) Heisei No. 08-277125, the entire contents of which are hereby incorporated herein by reference) describes a method of forming a coating of a group IIIa metal oxide on the surfaces of a glass lens molding material on which functional surfaces are to be formed. It is disclosed that so doing prevents fusion between the molding material and the surface of the mold.

Patent Document 2 (Japanese Unexamined Patent Publication (KOKAI) Showa No. 62-226825, the entire contents of which are hereby incorporated herein by reference) describes a method whereby a fusion-preventing layer is inserted between a glass member being molded that has a shape constituting the foundation of the finished shape of a lens and a pressing mold comprised of a glass having a higher glass transition temperature than the pressing temperature, and the glass member is press molded by the pressing mold while in a softened state.

Above-cited Patent Documents 1 and 2 describe the formation of a film on the surface of the glass material as a means of preventing fusion of the glass material and the pressing mold. However, they both have as their objective to prevent fusion between the glass material and the pressing mold, and do not seek to prevent scratching of press-molded glass products caused by handling after shaping by mechanical processing or the like.

Accordingly, the present invention has for its object to provide a means of solving the above-stated problems, whereby an optical element does not bear scratches on optically functional surfaces through contact during handling after the press molding of press molded glass products despite being comprised of a glass material with a high degree of abrasion, and a means whereby even when scratched, the function of the optical element finally obtained is unaffected.

DISCLOSURE OF THE INVENTION

The present invention, which solves the above-stated problems, consists of the following:

[1] A glass material for mold pressing, comprising a core portion comprised of an optical glass with a degree of abrasion FA of 200 or higher (referred to as the "first glass" hereinafter), and a covering portion comprised of a second glass covering at least a portion of the surface of said core portion.

[2] The glass material in accordance with [1], wherein said second glass has a degree of abrasion of less than 200.

[3] The glass material in accordance with [1] or [2], wherein the weight reduction rate of the second glass is 10 times or more the weight reduction rate of the first glass when subjected to a prescribed acid or alkali treatment.

[4] The glass material in accordance with any one of [1] to [3], wherein said first glass is a fluorophosphate glass.

[5] The glass material in accordance with [4], wherein said fluorophosphate glass, denoted as cation percentages, comprises the following components:

| | |
|---|---|
| $P^{5+}$ | 5 to 50 percent, |
| $Al^{3+}$ | 0.1 to 40 percent, |
| $Mg^{2+}$ | 0 to 20 percent, |
| $Ca^{2+}$ | 0 to 25 percent, |
| $Sr^{2+}$ | 0 to 30 percent, |
| $Ba^{2+}$ | 0 to 30 percent, |
| $Li^+$ | 0 to 30 percent, |
| $Na^+$ | 0 to 10 percent, |
| $K^+$ | 0 to 10 percent, |
| $Y^{3+}$ | 0 to 5 percent, |
| $La^{3+}$ | 0 to 5 percent, and |
| $Gd^{3+}$ | 0 to 5 percent. |

[6] The glass material in accordance with [5], wherein the molar ratio of the $F^-$ content to the total quantity of $F^-$ and $O^{2-}$ ($F^-/(F^-+O^{2-})$) is 0.25 to 0.95.

[7] The glass material in accordance with any one of [1] to [4], wherein said first glass is a phosphate glass.

[8] The glass material in accordance with [7], wherein said phosphate glass is an optical glass comprising, denoted as mol percentages: 15 to 45 percent of $P_2O_5$, 0 to 35 percent of $Nb_2O_5$, 2 to 35 percent of $Li_2O$, 0 to 20 percent of $TiO_2$, 0 to 40 percent of $WO_3$, 0 to 20 percent of $Bi_2O_3$, 0 to 30 percent of $B_2O_3$, 0 to 25 percent of BaO, 0 to 25 percent of ZnO, 0 to 20 percent of MgO, 0 to 20 percent of CaO, 0 to 20 percent of SrO, 0 to 40 percent of $Na_2O$, 0 to 30 percent of $K_2O$ (where the total quantity of $Li_2O$, $Na_2O$, and $K_2O$ is 45 percent or less), 0 to 15 percent of $Al_2O_3$, 0 to 15 percent of $SiO_2$, 0 to 10 percent of $La_2O_3$, 0 to 10 percent of $Gd_2O_3$, 0 to 10 percent of $Yb_2O_3$, 0 to 10 percent of $ZrO_2$, and 0 to 10 percent of $Ta_2O_5$.

[9] A method for manufacturing an optical glass element, characterized both in that a glass material that has been preformed to a prescribed shape is heat softened and press molded with a pressing mold and the outer perimeter portion of the molded product obtained is removed by mechanical processing; and in that the glass material described in any one of [1] to [8] is employed as said glass material.

[10] The manufacturing method in accordance with [9], wherein the second glass is removed from the surface of the molded product after said mechanical processing.

[11] The manufacturing method in accordance with [9], wherein an optically functional film is further formed without removing the second glass from the surface of the molded product after said mechanical processing.

The present invention effectively prevents scratching of the optically functional surface of a press molded product due to contact during handling after press molding in the course of the production of an optical glass element by precision mold pressing employing readily scratching glass with a high degree of abrasion. Further, for example, even when a portion corresponding to an optically functional surface of the press molded product is scratched, that portion is readily removed, making it possible to obtain an optical glass element having an original optically functional surface the optical performance of which is completely unaffected.

BEST MODES OF CARRYING OUT THE INVENTION

The glass material for mold pressing of the present invention is comprised of a core portion comprised of an optical glass having a degree of abrasion FA of 200 or higher (the first glass) and a covering portion, covering at least a portion of the surface of the core portion, comprised of a second glass.

The degree of abrasion FA of the optical glass is evaluated by the following method based on Japan Optical Glass Industry Standard JOGIS-1975.

A sample with a measurement area of 9 cm² is held at a fixed position 80 mm from the center of a flat cast iron dish rotating horizontally at 60 rpm. A lapping solution, comprised of 20 mL of water added to 10 g of alumina grit having an average particle diameter of 20 micrometers, is uniformly fed in over 5 minutes, and lapping is conducted at a load of 9.807 N. The sample is weighed before and after lapping and the abrasion weight W is obtained. The abrasion weight W0 of a standard sample (BSC7) specified by the Japan Optical Glass Industry Association is similarly measured, and the degree of abrasion (FA) is calculated by the following equation:

$$FA = (W/S)/(W0/S0) \times 100.$$

Here, S denotes the specific gravity of the sample and S0 denotes the specific gravity of the standard sample (BSC7).

The first glass in the present invention is an optical glass having a degree of abrasion of 200 or higher. The effect of the present invention is particularly pronounced when an optical glass with a degree of abrasion of 300 or higher is employed. There is no upper limit to the degree of abrasion, but in practical terms, it is about 600. The degree of abrasion of the first glass desirably falls within a range of 300 to 500. The composition is not specifically limited. However, by way of example, the present invention is carried out to great advantage with a fluorophosphate glass of $FA \geqq 400$ or a phosphate glass of $FA \geqq 300$.

The following are examples of the above-mentioned fluorophosphate glass: a fluorophosphate glass in the form of an optical glass comprising the following components, denoted as cation percentages:

| | |
|---|---|
| $P^{5+}$ | 5 to 50 percent, |
| $Al^{3+}$ | 0.1 to 40 percent, |
| $Mg^{2+}$ | 0 to 20 percent, |
| $Ca^{2+}$ | 0 to 25 percent, |
| $Sr^{2+}$ | 0 to 30 percent, |
| $Ba^{2+}$ | 0 to 30 percent, |
| $Li^+$ | 0 to 30 percent, |
| $Na^+$ | 0 to 10 percent, |
| $K^+$ | 0 to 10 percent, |
| $Y^{3+}$ | 0 to 5 percent, |
| $La^{3+}$ | 0 to 5 percent, and |
| $Gd^{3+}$ | 0 to 5 percent; | the above glass, in the form of an optical glass in which the molar ratio of the $F^-$ content to the total quantity of $F^-$ and $O^{2-}$ ($F^-(F^-+O^{2-})$) is 0.25 to 0.95; and the above glass, in the form of an optical glass comprising 2 to 30 cation percent of $Li^+$.

The effect of the present invention is particularly pronounced in the above glass, in the form of a fluorophosphate glass with a refractive index value nd ranging from 1.40 to 1.60 and an Abbé number (v(nu)d) of 67 or higher.

Table 1 gives specific examples of the above-described fluorophosphate glasses.

TABLE 1

| Glass composition | | Example | | | | |
|---|---|---|---|---|---|---|
| | | 1 | 2 | 3 | 4 | 5 |
| (Cation %) | $P^{5+}$ | 26.0 | 27.0 | 29.0 | 25.9 | 24.9 |
| | $Al^{3+}$ | 20.0 | 21.0 | 11.0 | 21.0 | 20.0 |
| | $Ba^{2+}$ | 10.0 | 11.0 | 12.0 | 11.3 | 9.7 |
| | $Sr^{2+}$ | 15.0 | 15.6 | 17.0 | 15.9 | 13.8 |
| | $Ca^{2+}$ | 14.0 | 9.1 | 10.0 | 9.4 | 8.1 |
| | $Mg^{2+}$ | 10.0 | 7.3 | 8.0 | 7.5 | 6.5 |
| | $Zn^{2+}$ | 0.0 | 0.0 | 0.0 | 0.0 | 0.0 |
| | $Li^+$ | 4.0 | 8.0 | 12.0 | 8.0 | 16.0 |
| | $Na^+$ | 0.0 | 0.0 | 0.0 | 0.0 | 0.0 |
| | $K^+$ | 0.0 | 0.0 | 0.0 | 0.0 | 0.0 |
| | $La^{3+}$ | 0.0 | 0.0 | 0.0 | 0.0 | 0.0 |
| | $Y^{3+}$ | 1.0 | 1.0 | 1.0 | 1.0 | 1.0 |
| | $Yb^{3+}$ | 0.0 | 0.0 | 0.0 | 0.0 | 0.0 |
| | $Gd^{3+}$ | 0.0 | 0.0 | 0.0 | 0.0 | 0.0 |
| | $B^{3+}$ | 0.0 | 0.0 | 0.0 | 0.0 | 0.0 |
| | $Cu^{2+}$ | 0.0 | 0.0 | 0.0 | 0.0 | 0.0 |
| (Anion %) | $F^-$ | 64.1 | 62.1 | 56.5 | 63.5 | 63.4 |
| | $O^{2-}$ | 35.9 | 37.9 | 43.5 | 36.5 | 36.6 |
| Refractive index (nd) | | 1.501 | 1.507 | 1.521 | 1.502 | 1.499 |
| Abbé No. (v(nu)d) | | 81.2 | 80.2 | 76.7 | 81.0 | 81.0 |
| Glass transition temperature (° C.) | | 429 | 417 | 375 | 406 | 375 |
| Degree of abrasion (FA) | | 410 | 400 | 440 | 440 | 450 |

| Glass composition | | Example | | | | |
|---|---|---|---|---|---|---|
| | | 6 | 7 | 8 | 9 | 10 |
| (Cation %) | $P^{5+}$ | 14.0 | 38.0 | 27.8 | 28.8 | 39.3 |
| | $Al^{3+}$ | 29.4 | 9.0 | 18.2 | 13.9 | 6.7 |
| | $Ba^{2+}$ | 8.2 | 16.0 | 6.1 | 4.0 | 19.4 |
| | $Sr^{2+}$ | 14.5 | 5.0 | 10.9 | 4.7 | 0.0 |
| | $Ca^{2+}$ | 22.4 | 4.0 | 9.4 | 6.5 | 5.8 |
| | $Mg^{2+}$ | 3.9 | 6.0 | 6.0 | 3.1 | 2.7 |
| | $Zn^{2+}$ | 0.0 | 0.0 | 0.0 | 5.3 | 0.0 |
| | $Li^+$ | 5.0 | 21.0 | 20.4 | 23.3 | 0.0 |
| | $Na^+$ | 0.0 | 0.0 | 0.0 | 7.4 | 0.0 |
| | $K^+$ | 0.0 | 0.0 | 0.0 | 0.0 | 0.0 |
| | $La^{3+}$ | 0.0 | 0.0 | 0.0 | 0.0 | 1.6 |
| | $Y^{3+}$ | 2.6 | 1.0 | 0.0 | 0.0 | 0.0 |
| | $Yb^{3+}$ | 0.0 | 0.0 | 0.0 | 0.0 | 2.2 |
| | $Gd^{3+}$ | 0.0 | 0.0 | 0.0 | 0.0 | 0.0 |
| | $B^{3+}$ | 0.0 | 0.0 | 0.0 | 0.0 | 10.0 |
| | $Cu^{2+}$ | 0.0 | 0.0 | 1.2 | 3.0 | 2.0 |
| (Anion %) | $F^-$ | 81.5 | 33.5 | 48.0 | 40.9 | 12.7 |
| | $O^{2-}$ | 18.5 | 66.5 | 52.0 | 59.1 | 87.3 |
| Refractive index (nd) | | 1.468 | 1.555 | 1.513 | 1.521 | 1.526 |
| Abbé No. (v(nu)d) | | 89.1 | 71.0 | 72.4 | 71.8 | 71.3 |
| Glass transition temperature (° C.) | | 404 | 374 | 370 | 330 | 395 |
| Degree of abrasion (FA) | | 470 | 400 | 420 | 440 | 400 |

The following are examples of the above-mentioned phosphate glass: a phosphate glass comprising, denoted as mol percentages: 15 to 45 percent of $P_2O_5$, 0 to 35 percent of $Nb_2O_5$, 2 to 35 percent of $Li_2O$, 0 to 20 percent of $TiO_2$, 0 to 40 percent of $WO_3$, 0 to 20 percent of $Bi_2O_3$, 0 to 30 percent of $B_2O_3$, 0 to 25 percent of BaO, 0 to 25 percent of ZnO, 0 to 20 percent of MgO, 0 to 20 percent of CaO, 0 to 20 percent of SrO, 0 to 40 percent of $Na_2O$, 0 to 30 percent of $K_2O$ (where the total quantity of $Li_2O$, $Na_2O$, and $K_2O$ is 45 percent or less), 0 to 15 percent of $Al_2O_3$, 0 to 15 percent of $SiO_2$, 0 to 10 percent of $La_2O_3$, 0 to 10 percent of $Gd_2O_3$, 0 to 10 percent of $Yb_2O_3$, 0 to 10 percent of $ZrO_2$, and 0 to 10 percent of $Ta_2O_5$.

Table 2 gives specific examples of the above phosphate glasses.

TABLE 2

| | | Example | | | | |
|---|---|---|---|---|---|---|
| | | 11 | 12 | 13 | 14 | 15 |
| Glass composition (weight %) | $P_2O_5$ | 39.0 | 37.0 | 25.0 | 31.0 | 27.0 |
| | $B_2O_3$ | | | 1.0 | | 4.0 |
| | $Li_2O$ | 1.0 | 1.0 | 4.0 | 5.0 | 2.0 |
| | $Na_2O$ | 15.0 | 14.0 | 10.0 | 5.0 | 5.0 |
| | $K_2O$ | 5.0 | 5.0 | 7.0 | 5.0 | 12.0 |
| | $TiO_2$ | 23.0 | 20.0 | 12.0 | 18.0 | 20.0 |
| | $Nb_2O_5$ | 5.0 | 5.0 | 41.0 | 36.0 | 30.0 |
| | BaO | 3.0 | | | | |
| | $Al_2O_3$ | 2.0 | 3.0 | | | |
| | MgO | 2.0 | 3.0 | | | |
| | CaO | | | | | |
| | SrO | | 2.0 | | | |
| | ZnO | 5.0 | 7.0 | | | |
| | $ZrO_2$ | | | | | |
| | $WO_3$ | | | 3.0 | | |
| | $La_2O_3$ | | | | | |
| | $Y_2O_3$ | | | | | |
| | $Gd_2O_3$ | | | | | |
| | $Yb_2O_3$ | | | | | |
| | $Ta_2O_5$ | | | | | |
| Total | | 100 | 100 | 100 | 100 | 100 |
| Refractive index (nd) | | 1.689 | 1.676 | 1.806 | 1.826 | 1.796 |
| Abbé No. (v(nu)d) | | 31.0 | 32.5 | 25.8 | 23.1 | 25.2 |
| Glass transition temperature (° C.) | | 510 | 510 | 510 | 520 | 530 |
| Degree of abrasion (FA) | | 400 | 390 | 320 | 370 | 330 |

| | | Example | | | | |
|---|---|---|---|---|---|---|
| | | 16 | 17 | 18 | 19 | 20 |
| Glass composition (weight %) | $P_2O_5$ | 27.0 | 27.0 | 27.0 | 27.0 | 24.0 |
| | $B_2O_3$ | 2.0 | 2.0 | 2.0 | | |
| | $Li_2O$ | 4.0 | 4.0 | 4.0 | 2.0 | 1.0 |
| | $Na_2O$ | 3.0 | 3.0 | 3.0 | 12.0 | 12.0 |
| | $K_2O$ | 11.0 | 11.0 | 11.0 | 5.0 | 7.0 |
| | $TiO_2$ | 15.0 | 15.0 | 15.0 | 24.0 | 29.0 |
| | $Nb_2O_5$ | 35.0 | 35.0 | 35.0 | 15.0 | 19.0 |
| | BaO | 3.0 | | | 10.0 | |
| | $Al_2O_3$ | | | | | |
| | MgO | | 1.0 | | | |
| | CaO | | 1.0 | | | |
| | SrO | | 1.0 | | | |
| | ZnO | | | | | |
| | $ZrO_2$ | | | | 5.0 | 6.0 |
| | $WO_3$ | | | 3.0 | | 2.0 |
| | $La_2O_3$ | | | | | |
| | $Y_2O_3$ | | | | | |
| | $Gd_2O_3$ | | | | | |
| | $Yb_2O_3$ | | | | | |
| | $Ta_2O_5$ | | | | | |
| Total | | 100 | 100 | 100 | 100 | 100 |
| Refractive index (nd) | | 1.789 | 1.784 | 1.803 | 1.801 | 1.829 |
| Abbé No. (v(nu)d) | | 25.6 | 25.3 | 25.4 | 25.6 | 24.1 |
| Glass transition temperature (° C.) | | 515 | 520 | 515 | 520 | 525 |
| Degree of abrasion (FA) | | 300 | 300 | 310 | 320 | 350 |

The first glass can be preformed in the manner set forth below.

A glass material suitable for use in the present invention is fabricated by preforming the first glass to a prescribed volume and shape. In this preforming, for example, a piece of glass can be cut from a block of optical glass, ground, and polished to preform it to prescribed volume and shape (preforming I). Further, a glass melt can be dripped from a pipe or separated while flowing to obtain glass gobs of prescribed weight, and the glass gobs can be preformed while cooling (preforming II). Here, the method employed can be one where the glass melt is received in a receiving mold through the bottom of which a gas is being blown, and the glass gob is preformed while being cooled and essentially being floated. This method is desirable due to high productivity and the fact that it yields a glass material with a smooth surface. In method II, after preforming while cooling the glass gob as set forth above, mechanical processing such as polishing can be added to microadjust the shape and volume; such methods can also be suitably applied to the present invention.

In the present invention, a glass material for mold pressing is obtained by covering a glass gob of the first glass that has been preformed as set forth above with a second glass.

The second glass will be described next.

As set forth further below, after press molding in the present invention, the covering portion may either be removed from the molded product, or left in place as is, without being removed. When the covering portion is left in place after press molding, a second glass having a lower degree of abrasion than the first glass is desirably employed to cover the surface of the first glass. The degree of abrasion of the second glass is desirably less than 200, preferably 150 or less. The composition thereof is not specifically limited. By way of example, the lower limit of the degree of abrasion of the second glass is 30, desirably 50.

Tables 3 and 4 give specific examples of second glasses having degrees of abrasion of less than 200.

TABLE 3

|  |  | $B_2O_3$ | $SiO_2$ | $Al_2O_3$ | $Li_2O$ | $Na_2O$ | $K_2O$ | MgO | CaO | SrO | BaO | ZnO |
|---|---|---|---|---|---|---|---|---|---|---|---|---|
| Example 21 | mol % | 56.1 | 8.7 | 0.5 | 0.0 | 0.0 | 0.0 | 0.0 | 20.3 | 0.0 | 0.0 | 0.0 |
| Example 22 | mol % | 41.0 | 26.0 | 1.3 | 0.0 | 0.0 | 0.0 | 0.0 | 0.0 | 0.0 | 25.2 | 0.0 |
| Example 23 | mol % | 18.3 | 55.1 | 4.2 | 0.0 | 0.0 | 0.0 | 0.0 | 0.0 | 0.0 | 22.4 | 0.0 |
| Example 24 | mol % | 23.4 | 46.6 | 1.2 | 0.0 | 0.0 | 0.0 | 0.0 | 0.0 | 0.0 | 28.8 | 0.0 |
| Example 25 | mol % | 19.5 | 45.3 | 0.9 | 0.0 | 0.0 | 0.0 | 0.0 | 1.6 | 0.0 | 28.9 | 2.0 |
| Example 26 | mol % | 8.6 | 53.1 | 2.2 | 23.2 | 0.0 | 1.1 | 0.0 | 0.0 | 0.0 | 8.1 | 3.2 |
| Example 27 | mol % | 9.4 | 74.4 | 0.0 | 0.0 | 9.2 | 5.8 | 0.0 | 0.0 | 0.0 | 1.2 | 0.0 |
| Example 28 | mol % | 6.0 | 76.7 | 0.0 | 0.0 | 5.4 | 9.5 | 0.0 | 2.3 | 0.0 | 0.0 | 0.0 |
| Example 29 | mol % | 2.9 | 74.3 | 0.0 | 0.0 | 5.8 | 11.1 | 0.0 | 0.0 | 0.0 | 4.3 | 1.7 |
| Example 30 | mol % | 6.9 | 63.5 | 0.0 | 0.0 | 1.1 | 11.6 | 0.0 | 0.0 | 0.0 | 0.0 | 16.8 |
| Example 31 | mol % | 11.2 | 69.3 | 2.5 | 0.0 | 8.1 | 0.0 | 0.0 | 0.0 | 0.0 | 0.0 | 8.8 |
| Example 32 | mol % | 19.6 | 47.9 | 3.5 | 12.0 | 0.0 | 0.0 | 3.6 | 1.3 | 0.0 | 11.0 | 0.0 |
| Example 33 | mol % | 6.5 | 45.1 | 2.3 | 10.1 | 0.0 | 0.0 | 0.0 | 8.6 | 7.5 | 8.5 | 5.0 |
| Example 34 | mol % | 52.5 | 0.0 | 2.5 | 0.0 | 0.0 | 0.0 | 0.0 | 0.0 | 0.0 | 0.0 | 20.0 |

|  |  | $La_2O_3$ | $Gd_2O_3$ | $Y_2O_3$ | $ZrO_2$ | $Ta_2O_5$ | $TiO_2$ | Total | $Tg_{TMA}$ (° C.) | Ts (° C.) | α100-300 (1/K) | FA |
|---|---|---|---|---|---|---|---|---|---|---|---|---|
| Example 21 | mol % | 9.9 | 0.0 | 0.0 | 4.5 | 0.00 | 0.00 | 100.0 | 645 | 680 | 71 | 70 |
| Example 22 | mol % | 6.5 | 0.0 | 0.0 | 0.0 | 0.00 | 0.00 | 100.0 | 625 | 655 | 84 | 130 |
| Example 23 | mol % | 0.0 | 0.0 | 0.0 | 0.0 | 0.00 | 0.00 | 100.0 | 650 | 690 | 63 | 110 |
| Example 24 | mol % | 0.0 | 0.0 | 0.0 | 0.0 | 0.00 | 0.00 | 100.0 | 660 | 685 | 71 | 130 |
| Example 25 | mol % | 0.0 | 0.0 | 0.0 | 0.0 | 0.00 | 1.70 | 100.0 | 625 | 670 | 74 | 150 |
| Example 26 | mol % | 0.4 | 0.0 | 0.0 | 0.0 | 0.00 | 0.00 | 100.0 | 474 | 517 | 104 | 110 |
| Example 27 | mol % | 0.0 | 0.0 | 0.0 | 0.0 | 0.00 | 0.00 | 100.0 | 565 | 625 | 89 | 100 |
| Example 28 | mol % | 0.0 | 0.0 | 0.0 | 0.0 | 0.00 | 0.00 | 100.0 | 550 | 615 | 90 | 110 |
| Example 29 | mol % | 0.0 | 0.0 | 0.0 | 0.0 | 0.00 | 0.00 | 100.0 | 505 | 550 | 105 | 120 |
| Example 30 | mol % | 0.0 | 0.0 | 0.0 | 0.0 | 0.00 | 0.00 | 100.0 | 560 | 625 | 91 | 120 |
| Example 31 | mol % | 0.0 | 0.0 | 0.0 | 0.0 | 0.00 | 0.00 | 100.0 | 525 | 595 | 54 | 100 |

TABLE 3-continued

| | | | | | | | | Total | Tg-TMA (°C.) | Ts (°C.) | α100-300 (1/K) | DHNO₃ |
|---|---|---|---|---|---|---|---|---|---|---|---|---|
| Example 32 | mol % | 1.0 | 0.0 | 0.0 | 0.0 | 0.00 | 0.00 | 100.0 | 540 | 585 | 89 | 100 |
| Example 33 | mol % | 1.8 | 0.0 | 0.0 | 3.1 | 0.00 | 1.55 | 100.0 | 548 | 595 | 84 | 160 |
| Example 34 | mol % | 12.5 | 7.5 | 0.0 | 5.0 | 0.00 | 0.00 | 100.0 | 614 | 653 | 67 | 60 |

TABLE 4

| | | $P_2O_5$ | $B_2O_3$ | $SiO_2$ | $Al_2O_3$ | $Li_2O$ | $Na_2O$ | $K_2O$ | MgO | CaO | SrO |
|---|---|---|---|---|---|---|---|---|---|---|---|
| Example 35 | mol % | 30.0 | 6.5 | 0.0 | 3.5 | 13.0 | 0.0 | 0.0 | 15.0 | 15.0 | 0.0 |
| Example 36 | mol % | 27.5 | 20.0 | 0.0 | 2.5 | 10.0 | 2.5 | 2.5 | 17.5 | 12.5 | 2.5 |
| Example 37 | mol % | 27.5 | 25.0 | 0.0 | 2.5 | 10.0 | 0.0 | 2.5 | 12.5 | 12.5 | 5.0 |
| Example 38 | mol % | 25.0 | 30.0 | 0.0 | 2.5 | 10.0 | 0.0 | 2.5 | 12.5 | 12.5 | 2.5 |
| Example 39 | mol % | 45.4 | 0.0 | 0.0 | 3.8 | 0.0 | 0.0 | 0.0 | 0.0 | 0.0 | 0.0 |
| Example 40 | mol % | 0.0 | 28.0 | 20.0 | 0.0 | 0.0 | 0.0 | 0.0 | 0.0 | 0.0 | 30.0 |
| Example 41 | mol % | 0.0 | 25.0 | 25.0 | 0.0 | 0.0 | 0.0 | 0.0 | 0.0 | 0.0 | 10.0 |
| Example 42 | mol % | 0.0 | 35.0 | 15.0 | 0.0 | 0.0 | 0.0 | 2.0 | 0.0 | 24.0 | 0.0 |
| Example 43 | mol % | 0.0 | 31.0 | 21.0 | 0.0 | 0.0 | 0.0 | 0.0 | 0.0 | 6.0 | 6.0 |
| Example 44 | mol % | 0.0 | 20.0 | 35.0 | 0.0 | 0.0 | 0.0 | 5.0 | 0.0 | 5.0 | 0.0 |
| Example 45 | mol % | 0.0 | 30.0 | 25.0 | 0.0 | 0.0 | 0.0 | 15.0 | 0.0 | 0.0 | 0.0 |
| Example 46 | mol % | 0.0 | 30.0 | 25.0 | 0.0 | 0.0 | 15.0 | 0.0 | 0.0 | 0.0 | 0.0 |
| Example 47 | mol % | 0.0 | 30.0 | 25.0 | 0.0 | 15.0 | 0.0 | 0.0 | 0.0 | 0.0 | 0.0 |
| Example 48 | mol % | 0.0 | 30.0 | 25.0 | 0.0 | 0.0 | 0.0 | 10.0 | 0.0 | 0.0 | 0.0 |
| Example 49 | mol % | 0.0 | 30.0 | 25.0 | 0.0 | 0.0 | 0.0 | 15.0 | 0.0 | 0.0 | 0.0 |
| Example 50 | mol % | 0.0 | 30.0 | 25.0 | 0.0 | 0.0 | 0.0 | 20.0 | 10.0 | 0.0 | 0.0 |
| Example 51 | mol % | 0.0 | 40.0 | 25.0 | 0.0 | 0.0 | 0.0 | 30.0 | 0.0 | 0.0 | 0.0 |
| Example 52 | mol % | 0.0 | 30.0 | 25.0 | 0.0 | 0.0 | 0.0 | 0.0 | 0.0 | 0.0 | 0.0 |
| Example 53 | mol % | 0.0 | 30.0 | 25.0 | 0.0 | 0.0 | 0.0 | 0.0 | 5.0 | 0.0 | 0.0 |
| Example 54 | mol % | 0.0 | 30.0 | 25.0 | 0.0 | 0.0 | 0.0 | 0.0 | 0.0 | 5.0 | 0.0 |
| Example 55 | mol % | 0.0 | 30.0 | 25.0 | 0.0 | 0.0 | 0.0 | 0.0 | 0.0 | 0.0 | 5.0 |
| Example 56 | mol % | 0.0 | 30.0 | 25.0 | 0.0 | 0.0 | 0.0 | 0.0 | 0.0 | 0.0 | 0.0 |
| Example 57 | mol % | 0.0 | 19.6 | 47.9 | 3.5 | 12.0 | 0.0 | 0.0 | 3.6 | 1.3 | 0.0 |
| Example 58 | mol % | 0.0 | 8.6 | 53.1 | 2.2 | 23.2 | 0.0 | 1.1 | 0.0 | 0.0 | 0.0 |
| Example 59 | mol % | 0.0 | 52.5 | 0.0 | 2.5 | 0.0 | 0.0 | 0.0 | 0.0 | 0.0 | 0.0 |

| | | BaO | ZnO | $La_2O_3$ | $Gd_2O_3$ | $Y_2O_3$ | Total | Tg-TMA (°C.) | Ts (°C.) | α100-300 (1/K) | DHNO₃ (vol %) |
|---|---|---|---|---|---|---|---|---|---|---|---|
| Example 35 | mol % | 15.0 | 2.0 | 0.0 | 0.0 | 0.0 | 100.0 | 489 | 532 | 120 | 0.16% |
| Example 36 | mol % | 2.5 | 0.0 | 0.0 | 0.0 | 0.0 | 100.0 | 484 | 528 | 112 | 0.25% |
| Example 37 | mol % | 2.5 | 0.0 | 0.0 | 0.0 | 0.0 | 100.0 | 497 | 540 | 101 | 0.21% |
| Example 38 | mol % | 2.5 | 0.0 | 0.0 | 0.0 | 0.0 | 100.0 | 498 | 542 | 91 | 0.29% |
| Example 39 | mol % | 48.5 | 0.0 | 0.0 | 2.3 | 0.0 | 100.0 | 558 | 602 | 140 | 0.15% |

TABLE 4-continued

| Example | | | | | | | | Tg-TMA | Ts | FA | D-HNO₃ |
|---|---|---|---|---|---|---|---|---|---|---|---|
| Example 40 | mol % | 20.0 | 0.0 | 0.0 | 0.0 | 2.0 | 100.0 | 586 | 625 | 110 | 0.17% |
| Example 41 | mol % | 30.0 | 10.0 | 0.0 | 0.0 | 0.0 | 100.0 | 578 | 628 | 103 | 0.15% |
| Example 42 | mol % | 24.0 | 0.0 | 0.0 | 0.0 | 0.0 | 100.0 | 607 | 664 | 108 | 0.14% |
| Example 43 | mol % | 36.0 | 0.0 | 0.0 | 0.0 | 0.0 | 100.0 | 581 | 625 | 107 | 0.15% |
| Example 44 | mol % | 35.0 | 0.0 | 0.0 | 0.0 | 0.0 | 100.0 | 576 | 635 | 109 | 0.17% |
| Example 45 | mol % | 30.0 | 0.0 | 0.0 | 0.0 | 0.0 | 100.0 | 467 | 516 | 133 | 0.14% |
| Example 46 | mol % | 30.0 | 0.0 | 0.0 | 0.0 | 0.0 | 100.0 | 472 | 515 | 126 | 0.17% |
| Example 47 | mol % | 30.0 | 0.0 | 0.0 | 0.0 | 0.0 | 100.0 | 495 | 530 | 107 | 0.16% |
| Example 48 | mol % | 30.0 | 5.0 | 0.0 | 0.0 | 0.0 | 100.0 | 509 | 559 | 117 | 0.12% |
| Example 49 | mol % | 10.0 | 20.0 | 0.0 | 0.0 | 0.0 | 100.0 | 520 | 567 | 105 | 0.16% |
| Example 50 | mol % | 15.0 | 0.0 | 0.0 | 0.0 | 0.0 | 100.0 | 460 | 506 | 133 | 0.16% |
| Example 51 | mol % | 0.0 | 5.0 | 0.0 | 0.0 | 0.0 | 100.0 | 466 | 505 | 147 | 0.36% |
| Example 52 | mol % | 45.0 | 0.0 | 0.0 | 0.0 | 0.0 | 100.0 | 580 | 620 | 107 | 0.16% |
| Example 53 | mol % | 40.0 | 0.0 | 0.0 | 0.0 | 0.0 | 100.0 | 591 | 630 | 102 | 0.21% |
| Example 54 | mol % | 40.0 | 0.0 | 0.0 | 0.0 | 0.0 | 100.0 | 592 | 632 | 106 | 0.17% |
| Example 55 | mol % | 40.0 | 0.0 | 0.0 | 0.0 | 0.0 | 100.0 | 592 | 632 | 105 | 0.15% |
| Example 56 | mol % | 40.0 | 5.0 | 0.0 | 0.0 | 0.0 | 100.0 | 586 | 627 | 102 | 0.18% |
| Example 57 | mol % | 11.0 | 0.0 | 1.0 | 0.0 | 0.0 | 100.0 | 540 | 585 | 104 | 0.05% |
| Example 58 | mol % | 8.1 | 3.2 | 0.4 | 0.0 | 0.0 | 100.0 | 474 | 517 | 89 | 0.03% |
| Example 59 | mol % | 0.0 | 20.0 | 12.5 | 7.5 | 0.0 | 100.0 | 614 | 653 | 67 | 0.01% |

In the tables,
Tg-TMA: Glass transition temperature
Ts: Sag point
α(alpha)100-300: Coefficient of linear expansion in the high temperature range (100-300° C.)
FA: Degree of abrasion (the larger the number, the more readily the substance is abraded)
D-HNO₃: Etching rate The etching rate was the average weight reduction rate per minute (wt %/min) when placed in 50° C. 0.1N nitric acid (HNO₃) for 10 to 25 minutes.

On the other hand, the second glass can also be removed from the surface of the molded product after press molding in the present invention. The second glass can be removed by etching. More specifically, the second glass can be removed by etching with an acid or alkali. When removing the second glass by etching with an acid or alkali, the weight reduction rate of the second glass when processed with a prescribed acid or alkali is desirably 10 times the weight reduction rate of the first glass.

The acid, alkali, or the like employed in etching is not specifically limited. Nor is the type or concentration of etching solution specifically limited. Nitric acid, hydrochloric acid, sulfuric acid, acetic acid, phosphoric acid, an aqueous solution of sodium hydroxide or potassium hydroxide, or the like can be suitably diluted for use as a 0.1 to 0.0001N aqueous solution, or a commercial mixed acid, mixed alkali, cleaning solution, or the like can be employed based on the objective. In this process, the concentration is desirably adjusted to a degree at which the first glass does not etch. Nitric acid, hydrochloric acid, sodium hydroxide, and the like which do not cause salts to precipitate out due to the reaction with glass components are particularly desirable. Buffer solutions, chelating agents, and the like can be added to the etching solution to the extent that the object of the present invention is not lost.

The site that is covered by the second glass can be selected by taking into account the steps and handling to which the molded product is subjected after press molding. For example, in the centering and edging step, in the course of chucking the molded product with opposing bell members, when one side (the fixed shaft side, for example) causes greater damage to the molded product than the other (the moving shaft side, for example), it is possible to provide a covering portion on that surface alone. The covering portion is desirably provided so as to cover the entire core portion comprised of the first glass.

The method of applying the second glass will be described next.

The preformed product comprised of the first glass that has been preformed as set forth above is covered with the second glass. The method of application can be a known film-forming method such as sputtering or vacuum deposition. For example, sputtering with argon gas with the second glass as the target is desirably used to form a covering layer of the second glass.

When the film is excessively thick, the covering portion is unable to follow as the core portion glass deforms and spreads in the course of press molding the glass material, and cracking tends to occur. When the film is excessively thin, there are cases where scratching cannot be adequately prevented. The film thickness desirably ranges from 0.1 to 1,000 nm, preferably 0.1 to 500 nm, and most preferably, 2 to 100 nm. The covering portion is desirably applied so as to completely envelope the core portion, but so long as at least the region serving as the effective diameter of the optical element obtained is covered, partial covering is acceptable.

A carbon-containing film is desirably present on the surface (that is, the side beyond the covering portion) of the glass material of the present invention. Such a film imparts an adequate sliding property against the pressing mold while the glass material is being fed into the pressing mold prior to pressing, allowing the glass material to slide to a prescribed position (center position) within the pressing mold, and extending with the glass deformation on the surface of the glass material as the glass material is softened and deformed by pressing to facilitate spreading of the glass material along the surface of the pressing mold. It is also useful to facilitate mold release so that when the molded product has been cooled to a prescribed temperature after pressing, the glass separates readily from the surface of the pressing mold.

The carbon-containing film is desirably primarily comprised of carbon, and may be a film that contains components other than carbon, such as a hydrocarbon film. The film can be formed from a carbon starting material by a known film-forming method such as vacuum deposition, sputtering, ion plating, plasma treatment, or ion gun treatment. The film can also be formed by thermal decomposition of a carbon-containing compound such as hydrocarbon.

In the case of the thermal decomposition of hydrocarbon, a glass gob that has been provided with a covering portion is received in a reaction vessel and brought into contact with hydrocarbon gas by introducing the same. The hydrocarbon is thermally decomposed to form a carbon film on the surface of the glass material. The hydrocarbon employed can be acetylene, ethylene, butane, ethane, propyne, propane, benzene, or the like. Acetylene is desirable from the perspective of having a relatively low thermal decomposition temperature. It is desirable for the temperature within the reaction vessel to have been raised to the thermal decomposition temperature by the time the hydrocarbon is introduced. The temperature range is suited to thermal decomposition of the hydrocarbon, and is normally 250 to 600° C. For example, when the hydrocarbon is acetylene, the temperature range is 400 to 550° C., desirably 480 to 510° C. The film is suitably 1 to 20 nm, desirably 1 to 10 nm, and preferably 2 to 5 nm, in thickness.

The present invention includes a method for manufacturing an optical glass element by heat softening a glass material that has been preformed to a prescribed shape and conducting press molding with a pressing mold. The above-described glass material of the present invention is employed in this method for manufacturing an optical glass element.

The press molding method will be described. A pressing mold having adequate thermal resistance and rigidity made of a dense material that has been precisely processed can be employed in press molding. Examples are pressing molds of silicon carbide, silicon nitride, tungsten carbide, aluminum oxide, titanium carbide, and metals such as stainless steel; as well as such pressing molds the surfaces of which have been coated with films of carbon, heat-resistant metals, noble metal alloys, carbides, nitrides, or borides.

The film covering the pressing surface desirably contains carbon. A carbon-containing film comprised of a single component layer or mixed layer of amorphous or crystalline graphite and/or diamond is desirably employed. The carbon film can be formed by means such as sputtering, plasma CVD, CVD, or ion plating. For example, the film can be formed by sputtering employing an inert gas such as Ar as the sputtering gas and graphite as the sputtering target. Alternatively, microwave plasma CVD can be used to form a film employing methane gas and hydrogen gas as starting material gases. When forming the film by ion plating, ionization can be conducted with benzene gas. These carbon films include films having C—H bonds.

Press molding can be conducted by the following method, for example.

In press molding, a pressing mold (comprising an upper mold, lower mold, and sleeve mold) and a glass material are heated to within a temperature range suited to pressing. For example, press molding is desirably conducted with the glass material and pressing mold in a temperature range at which the viscosity of the glass material is $10^5$ to $10^{10}$ dPa·s. The glass material can be introduced into the pressing mold and both the glass material and pressing mold heated to within the above-stated temperature range, or the glass material and pressing mold can be separately heated to within the above-stated temperature range prior to positioning the glass material within the pressing mold. Further, a step can be employed in which the glass material is heated to a temperature corresponding to a viscosity of $10^5$ to $10^9$ dPa·s, the pressing mold is separately heated to a temperature corresponding to a glass viscosity of $10^9$ to $10^{12}$ dPa·s, the glass material is positioned within the pressing mold, and press molding is immediately conducted. In that case, since the temperature of the pressing mold can be kept relatively low, desirable effects are achieved in that the heating/cooling cycle of the molding machine can be shortened and deterioration due to heating of the pressing mold can be inhibited. In either case, cooling begins when press molding begins, or after it has begun. While applying a suitable load schedule and maintaining tight contact between the pressing surface and the glass element, the temperature is lowered. Subsequently, the mold is released and the molded product is removed. The mold release temperature desirably corresponds to a viscosity of $10^{12.5}$ to $10^{13.5}$.

The carbon-containing film can be removed from the surface of the molded product obtained by press molding. Further, the molded product can be annealed to remove strain and/or adjust the refractive index as needed. When that is done, the carbon-containing film can be removed by heating in an oxidizing atmosphere.

In the method for manufacturing an optical glass element of the present invention, mechanical processing such as centering and edging is conducted after removing the carbon-containing film from the press molded product, or without removing the carbon-containing film. In the centering and edging step, a canter matching the pivotal axis of the lens is extracted for centering and edging processing of the optical axis of the lens, the optical axis of the lens is fixed at the pivotal axis, the portion around the axis is rotated, and the perimeter of the lens is brought into contact with a grindstone. During this process, the lens is bell chucked with opposing bell members, gripped between the two bell members, and subjected to pressure. That is, in the course of gripping and pressing the lens, the optically functional surface slides over the bell surface to conduct the centering and edging.

The covering portion of the present invention can be removed from the surface of the molded product as needed. Either a physical or chemical method of removal can be employed. A method based on abrasive cloth can be employed for physical removal. Etching can be employed as a chemical removal method. To remove the coating film by etching, as set forth above, it is desirable to select a second glass having a higher acid or alkali etching rate than the first glass.

The etching step can be conducted in the order of, for example, etching, rinsing, and drying. For example, a press molded product that has been mechanically processed by centering and edging or the like can be set in a jig or the like, immersed in a vessel containing etching solution for a prescribed period (10 to 300 seconds, for example), and once the covering portion has been removed, immersed in a vessel containing water to remove the etching solution from the surface of the molded product. The water can then be removed from the surface of the molded product in a drier to obtain a dried molded product. Following any of these steps, a cleaning step can be used to increase the cleanliness of the surface of the molded product. However, from the perspective of increasing the cleanliness of the surface of the molded product, the molded product is desirably subjected to a lens cleaning step prior to the drying step.

Neither the type nor concentration of the etching solution is specifically limited. Nitric acid, hydrochloric acid, sulfuric acid, a mixture of two or more of the same, an aqueous solution of sodium hydroxide or potassium hydroxide, or the like can be suitably diluted for use as a 0.0001 N to 1 N aqueous solution, or a commercial mixed acid, mixed alkali, cleaning solution, or the like can be employed based on the objective.

The etching step is desirably conducted after subjecting the molded product obtained by press molding to an annealing and/or centering and edging step.

An optically functional film can be provided on the surface of the molded product thus obtained. One example of an optically functional film is an antireflective film. When the covering portion is not removed from the surface of the molded product, the covering portion can be employed as an optically functional film on an optical element, or a part thereof. In that case, a desired antireflective film can be suitably formed as a single layer or multiple layer of a known material on the molded product having a covering portion.

The optical element of the present invention can be employed as a small diameter, thin, lightweight lens, such as the small image pickup lenses mounted in portable image pickup apparatuses and the like; communication lens; optical pickup object lens; collimator lens; or the like. However, no limitation thereto is intended.

EMBODIMENTS

The present invention will be described in greater detail below through embodiments.

Embodiment 1

A convex meniscus glass lens with a diameter of 20 mm was formed using optical glass A (Tg=429° C., nd=1.501, v(nu)d=81.2, FA=490) of example 1 of Table 1 above as the first glass.

First, a melt of optical glass A was dripped into a receiving mold, cooled, and flattened from a spherical shape to preform a glass gob with biconvex surfaces. Next, glass B (FA=110) in the form of the multicomponent glass of example 26 in Table 3 was employed as target and sputtering was conducted to form a covering portion 15 nm in thickness on the surface of the preformed glass gob.

Next, a carbon-containing film was formed on the surface of the covered glass gob.

That is, a glass gob that had been provided with a covering portion was placed in a reaction vessel and the air in the reaction vessel was exhausted. When hydrocarbon (acetylene gas was employed here) was introduced and thermally decomposed, a carbon film formed on the surface of the glass material.

The above-described glass gob after covering was employed as a glass material in press molding. That is, a pressing mold comprised of a sleeve mold and upper and lower molds made of SiC, with a carbon-containing mold release film formed on the pressing surfaces of the upper and lower molds by sputtering, was heated to a temperature corresponding to a glass A viscosity of $10^{8.5}$ dPa·s. The glass material was heated to a temperature at which glass A exhibited a viscosity of $10^{7.2}$ dPa·s and fed into the pressing mold. During feeding, the glass material was maintained on a separable mold with air blowing and softened by heating. The mold was then separated, causing the glass material to drop onto the lower mold.

Immediately after feeding, the glass material was pressed between the upper and lower molds, and, while maintaining tight contact between the glass and the upper and lower molds, cooled to a temperature below the annealing temperature of glass A. The molded product was then removed from within the pressing mold. This press molding was conducted to continuously mold 100 pieces of molded product.

The molded product obtained was maintained in a heating furnace for 2 hours and then annealed by decreasing the temperature by −50° C./hour.

Following annealing, the molded product was subjected to centering and edging with a centering and edging machine to remove the outer perimeter of the molded product, and the center of the outer diameter was aligned with the optical axis. Evaluation of the molded product with a magnifying glass after centering and edging revealed that in about 10 percent of the molded product, annular scratches were observed at spots that had been bell chucked with the bell member of the centering and edging machine during centering and edging.

Etching was then conducted to remove the covering portion on the surface of the molded product. Specifically, the molded product was immersed in a 50° C. 0.1N $HNO_3$ aqueous solution for 300 seconds, cleaned with water upon being withdrawn, and dried.

Finally, an antireflective film was formed on the molded product after cleaning to obtain glass lenses.

One hundred glass lenses obtained as set forth above were evaluated. As a result, scratches on the optically functional surfaces of the glass lenses had been removed along with the covering portion in the centering and edging step. These lenses thus all fully met the specifications of optical apparatuses for both shape precision and external appearance.

Comparative Example 1

For comparison, a sample was fabricated in which just a carbon-containing film was formed, without providing a covering portion, on the surface of the glass gob comprised of optical glass A that had been preformed in Embodiment 1. The comparative sample was subjected to the same continuous pressing as that set forth above, the molded product was annealed after press molding, and centering and edging was conducted with a centering and edging machine identical to that employed in the above-described embodiment to remove the outer perimeter of the molded product. Evaluation of the molded product with a magnifying glass after centering and edging revealed that about 85 percent of the molded product had annular scratches on optically functional surfaces.

Accordingly, the molded product was washed and an antireflective film was formed on the surface thereof to obtain lenses, but about 85 percent of the lenses were defective in external appearance.

Embodiment 2

A convex meniscus glass lens 18 mm in diameter was molded employing the optical glass (Tg=520° C., nd=1.826, v(nu)d=23.1, and FA=370) of example 14 in Table 2 above as the first glass.

First, a melt of optical glass C was dripped onto a receiving mold, cooled, and preformed to obtain biconvex glass pieces in the form of flattened spheres. Next, multicomponent glass D (FA=100) of Example 31 in Table 3 was employed as target to form covering portions 13 nm in thickness on the surface of the preformed glass pieces by sputtering.

Next, a carbon-containing film was formed on the surface of the glass pieces after the above covering and the glass pieces were employed as a glass material in press molding identical to that in the above embodiment to obtain 100 pieces of molded product.

The molded product obtained was kept in a heating furnace for 2 hours and then annealed by lowering the temperature by −50° C./hour.

Following annealing, the molded product was subjected to centering and edging with a centering and edging machine to remove the outer perimeter of the molded product, and the center of the outer diameter was aligned with the optical axis. Evaluation of the molded product with a magnifying glass after centering and edging revealed no scratching on any of the pieces.

Etching was then conducted to remove the covering portion on the surface of the molded product. Specifically, the pieces were immersed in a 50° C. 0.1N $HNO_3$ aqueous solution for 300 seconds, withdrawn, cleaned with pure water, and dried.

Finally, an antireflective film was formed on the cleaned molded product to obtain glass lenses.

Evaluation of 100 glass lenses obtained in this manner revealed that they fully met the specifications of optical apparatuses in terms of both external appearance and shape precision.

Comparative Example 2

For comparison, samples having only carbon-containing films were fabricated without providing a covering portion on the surface of glass pieces comprised of optical glass C that had been preformed in Embodiment 2. The comparative samples were subjected to the same continuous pressing as that set forth above, annealed after press molding, and subjected to centering and edging with a centering and edging machine in the same manner as in the above embodiments to remove the outer perimeter of the molded product. When the molded product was evaluated with a magnifying glass after centering and edging, about 85 percent of the molded product exhibited annular scratches on optically functional surfaces. After washing the molded product, an antireflective film was formed on the surface thereof to obtain glass lenses, but there was an external appearance failure rate of about 85 percent.

INDUSTRIAL APPLICABILITY

The present invention can be employed in the field of manufacturing optical glass elements such as glass lenses.

The invention claimed is:

1. A glass material for mold pressing, comprising:
    a core portion comprised of an optical glass with a degree of abrasion FA of 200 or higher (referred to as the "first glass" hereinafter), and
    a covering portion comprised of a second glass covering at least a portion of the surface of said core portion,
    wherein said second glass has a degree of abrasion of less than 200 and a film thickness of said second glass is within a range of 0.1 nm to 100 nm.

2. The glass material in accordance with claim 1, wherein the weight reduction rate of the second glass is 10 times or more the weight reduction rate of the first glass when subjected to a prescribed acid or alkali treatment.

3. The glass material in accordance with claim 1, wherein said first glass is a fluorophosphate glass.

4. The glass material in accordance with claim 3, wherein said fluorophosphate glass, denoted as cation percentages, comprises the following components:

| | |
|---|---|
| $P^{5+}$ | 5 to 50 percent, |
| $Al^{3+}$ | 0.1 to 40 percent, |
| $Mg^{2+}$ | 0 to 20 percent, |
| $Ca^{2+}$ | 0 to 25 percent, |
| $Sr^{2+}$ | 0 to 30 percent, |
| $Ba^{2+}$ | 0 to 30 percent, |
| $Li^+$ | 0 to 30 percent, |
| $Na^+$ | 0 to 10 percent, |
| $K^+$ | 0 to 10 percent, |
| $Y^{3+}$ | 0 to 5 percent, |
| $La^{3+}$ | 0 to 5 percent, and |
| $Gd^{3+}$ | 0 to 5 percent. |

5. The glass material in accordance with claim 4, wherein the molar ratio of the $F^-$ content to the total quantity of $F^-$ and $O^{2-}$ ($F^-/(F^-+O^{2-})$) is 0.25 to 0.95.

6. The glass material in accordance with claim 1, wherein said first glass is a phosphate glass.

7. The glass material in accordance with claim 6, wherein said phosphate glass is an optical glass comprising, denoted as mol percentages: 15 to 45 percent of $P_2O_5$, 0 to 35 percent of $Nb_2O_5$, 2 to 35 percent of $Li_2O$, 0 to 20 percent of $TiO_2$, 0 to 40 percent of $WO_3$, 0 to 20 percent of $Bi_2O_3$, 0 to 30 percent of $B_2O_3$, 0 to 25 percent of BaO, 0 to 25 percent of ZnO, 0 to 20 percent of MgO, 0 to 20 percent of CaO, 0 to 20 percent of SrO, 0 to 40 percent of $Na_2O$, 0 to 30 percent of $K_2O$ (where the total quantity of $Li_2O$, $Na_2O$, and $K_2O$ is 45 percent or less), 0 to 15 percent of $Al_2O_3$, 0 to 15 percent of $SiO_2$, 0 to 10 percent of $La_2O_3$, 0 to 10 percent of $Gd_2O_3$, 0 to 10 percent of $Yb_2O_3$, 0 to 10 percent of $ZrO_2$, and 0 to 10 percent of $Ta_2O_5$.

8. The glass material in accordance with claim 1, wherein the weight reduction rate of the second glass is 10 times or more the weight reduction rate of the first glass when subjected to a prescribed acid or alkali treatment.

9. A method for manufacturing an optical glass element, characterized both in that a glass material that has been preformed to a prescribed shape is heat softened and press molded with a pressing mold and the outer perimeter portion of the molded product obtained is removed by mechanical processing; and in that the glass material in accordance with claim 1 is employed as said glass material.

10. The manufacturing method in accordance with claim 9, wherein the second glass is removed from the surface of the molded product after said mechanical processing.

11. The manufacturing method in accordance with claim 9, wherein an optically functional film is further formed without removing the second glass from the surface of the molded product after said mechanical processing.

* * * * *